United States Patent [19]

Olsson et al.

[11] 3,913,683

[45] Oct. 21, 1975

[54] IMPLEMENT TRANSPORT ATTACHMENT

[75] Inventors: Nils O. Olsson, Ancaster; Robert W. Logue, Hamilton, both of Canada

[73] Assignee: International Harvester Company, Chicago, Ill.

[22] Filed: Jan. 11, 1971

[21] Appl. No.: 105,191

[52] U.S. Cl. .................. 172/240; 56/228; 111/54; 172/318; 172/400; 280/414.5
[51] Int. Cl.² ................. A01B 63/22; A01B 73/00
[58] Field of Search ........... 172/240, 248, 318, 400, 172/413; 111/52–54, 85; 56/228; 280/34 R, 34 A, 43.23, 80 R, 50 A, 400, 414.5, 415 R

[56] References Cited
UNITED STATES PATENTS

| | | | |
|---|---|---|---|
| 713,459 | 11/1902 | Larsen | 172/400 |
| 1,685,318 | 9/1928 | Elder | 172/240 |
| 2,696,772 | 12/1954 | Underdown | 172/240 |
| 2,705,447 | 4/1955 | Robbins | 172/401 |
| 2,900,031 | 8/1959 | Sorensen et al. | 172/44 |
| 3,090,449 | 5/1963 | Ward | 172/413 |
| 3,177,830 | 4/1965 | Zimmerman | 111/85 |
| 3,186,494 | 6/1965 | Jackson | 172/311 |
| 3,288,480 | 11/1966 | Calkins et al. | 172/456 X |
| 3,402,938 | 9/1968 | McCallum | 172/240 |
| 3,410,569 | 11/1968 | Blake | 280/43.23 |
| 3,610,661 | 10/1971 | Pierce et al. | 172/240 |
| 3,651,870 | 3/1972 | Calkins | 172/44 |

FOREIGN PATENTS OR APPLICATIONS 691,526 5/1953 United Kingdom................ 172/248

*Primary Examiner*—Edgar S. Burr
*Assistant Examiner*—Paul T. Sewell
*Attorney, Agent, or Firm*—Neal C. Johnson; Floyd B. Harman

[57] ABSTRACT

A grain drill adapted to be towed in a forward direction during a planting operation and supported by a forwardly disposed caster wheel and rearwardly disposed non-caster wheels. A pair of transport units is attached to the frame of the drill rearwardly of the non-caster wheels. Each unit includes a pair of transport wheel assemblies interconnected by a hydraulic power unit for swinging transport wheels between raised and ground-engaging positions. In the ground-engaging position the non-caster wheels are supported off the ground and the drill is supported for transport in either forward or endwise directions.

2 Claims, 5 Drawing Figures

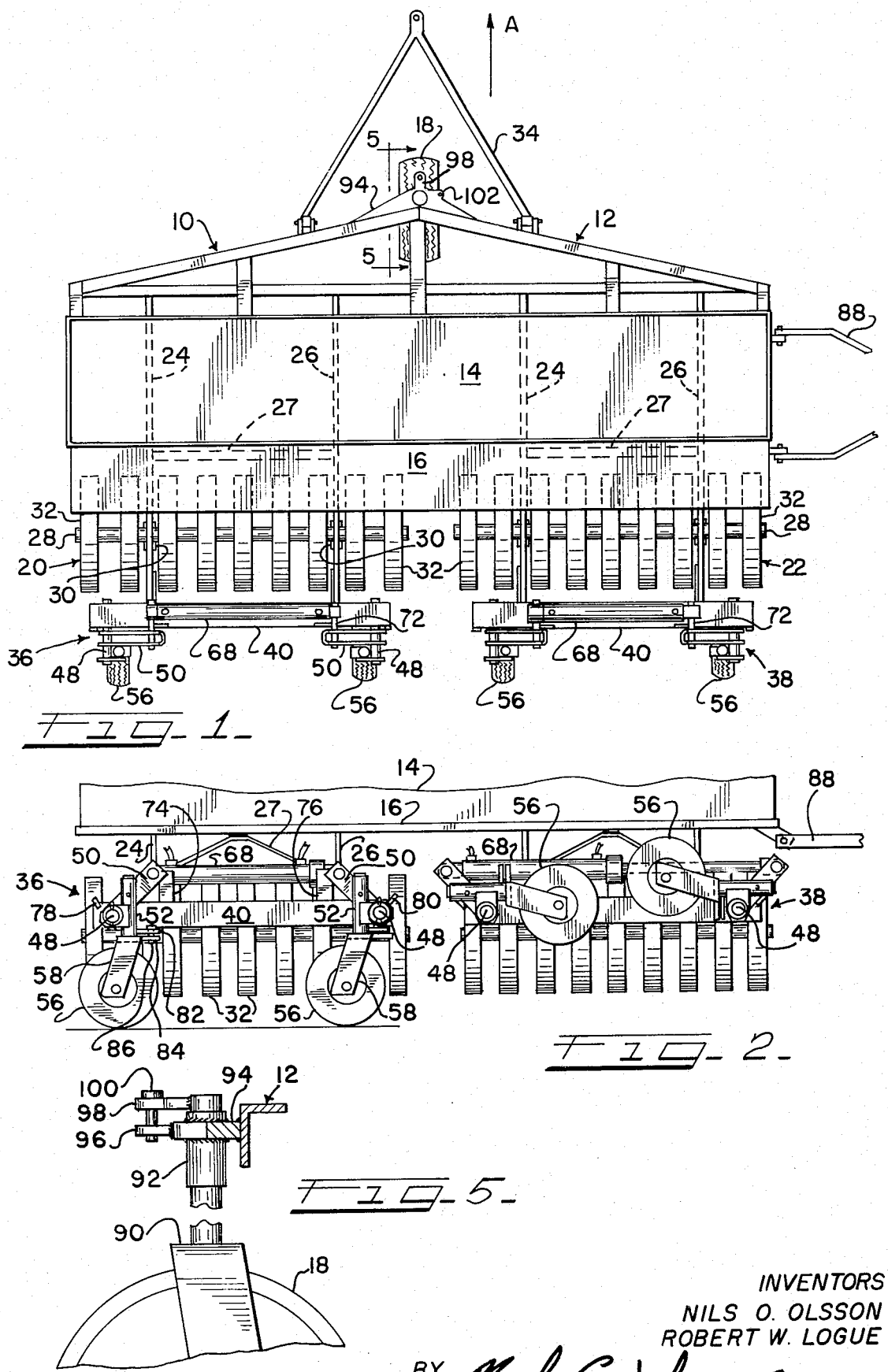

INVENTORS
NILS O. OLSSON
ROBERT W. LOGUE
BY Neal C. Johnson ATT'Y.

3,913,683

IMPLEMENT TRANSPORT ATTACHMENT

BACKGROUND OF THE INVENTION

1. Field of the Invention

The invention relates generally to implements adapted for towing and more particularly to an attachment which facilitates transport of the implement in either a forward direction or a transverse direction.

2. Prior Art

Agricultural type implements such as grain drills, for example, are characteristically designed of substantial lengths transverse to the normal direction of travel so as to cover as much ground as practical during each pass of the implement across the field. The trend in recent years has been to interconnect similar units in end-to-end relation to greatly increase the total area covered during each pass.

A basic problem encountered with such implements is designing a simple and effective means facilitating transport along narrow roadways or through narrow gates as the implement is moved from field to field.

Another problem encountered in the transport of an implement regardless of the length thereof is that the wheels supporting the implement during normal field operation and also during transport in a forward direction may not have been designed to withstand the stress imposed by repeated and prolonged transport at relatively high speeds. In the case of a grain drill, for example, the normal packing or "press" wheels may be subjected to undue strain and wear in such circumstances.

A further problem relates to the costs involved in incorporating transport structure into an implement. In some cases an existing implement must be redesigned and structurally modified to accommodate the transport structure. An example of such redesign and modification is shown in U.S. Pat. No. 3,115,853 wherein certain of the normal packing wheels 40 of a grain drill must be removed so that transport wheels may be substituted therefor.

A further common problem is in the amount of time and effort required to convert an implement having transport structure between operative and transport modes. The problem may be most significant in the case of converting from forward to endwise transport.

SUMMARY

The invention relates to a transport attachment for an implement wherein the transport wheels are mounted on the implement for movement between raised and ground-engaging positions. When in the latter position, the transport wheels support the implement for transport in the direction of normal operation of the implement or transversely to that direction as in endwise transport, for example.

When the transport attachment is affixed to an implement having a substantial length transverse to the forward direction of travel of the implement, the attachment permits endwise transport through narrow gates and along narrow roadways. This advantage is significantly increased when the attachment is used on each of a plurality of end-to-end coupled implements.

The transport attachment of the invention is itself of relatively simple construction and is arranged for connection to an implement such as a grain drill, for example, without requiring any significant modification of the implement or interference with the normal function of the implement. Once installed, the transport attachment is quickly and easily arranged to provide for transport of the implement in the normal direction of operation or in a transverse direction such as for endwise transport.

Briefly, the objects of the invention are to provide a transport attachment which: facilitates movement of an implement between work areas; permits movement of an implement in either forward or transverse directions; is of relatively simple design and construction; and is mountable on an implement without requiring redesign or significant modification of the implement.

BRIEF DESCRIPTION OF THE DRAWINGS

FIG. 1 is a plan view of a grain drill showing the transport units of the invention mounted thereon;

FIG. 2 is a fragmentary end elevation of the grain drill of FIG. 1 showing the ground-engaging and raised positions of the transport units;

FIG. 5 is an enlarged sectional view taken in the direction of arrows 5—5 of FIG. 1.

DESCRIPTION OF THE PREFERRED EMBODIMENT

Figure 3:
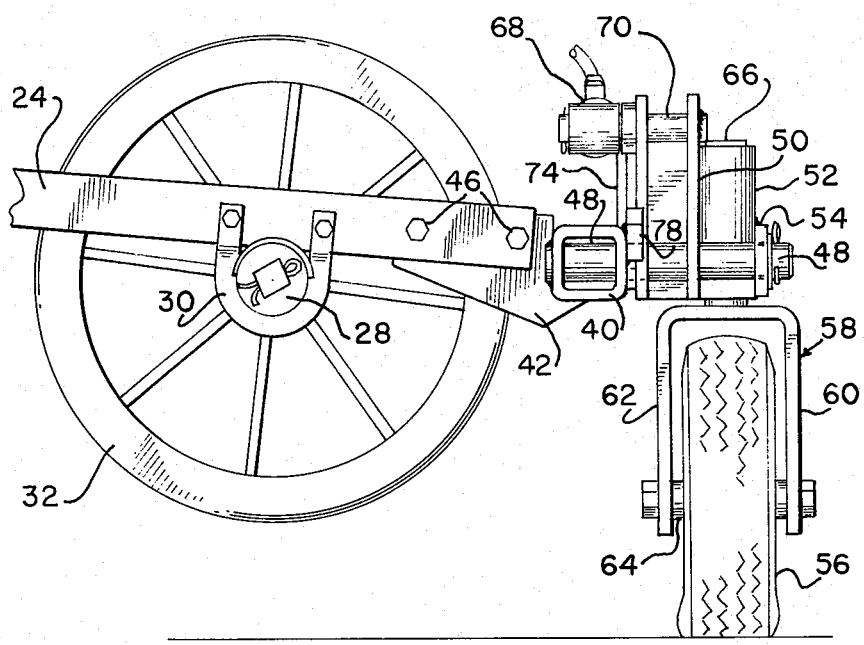
FIG. 3 is a fragmentary enlarged elevation of the transport unit of the invention connected to the framework of the drill.

Referring first to FIG. 1 there is shown a plan view of a conventional grain drill of the so-called press type used for seeding crops such as grain and the like. The drill includes a generally horizontally disposed framework 12 which supports a relatively long and narrow hopper 14 for gravity feeding of the seeds to suitable ground-opening and planting units (not shown) suspended from the framework. Such drills normally include a footboard 16 disposed along the lower edge of the hopper to provide a work platform upon which an operator may stand when filling or checking the hopper.

The grain drill 10 is supported by a forwardly and centrally disposed caster wheel 18 and a pair of press wheel gangs 20 and 22. Each press wheel gang includes a pair of so-called drawbars 24 and 26 pivotally connected to the forward portion of framework 12 and extending rearwardly beneath the hopper 14 and footboard 16. A cross brace 27 interconnects the drawbars 24 and 26 and engages the framework as shown generally in FIG. 2. An axle 28 is supported from the drawbars 24 and 26 by brackets 30, one of which being best shown in FIG. 3. A plurality of spoke-type press wheels 32 are rotatably mounted on each axle 28 in spaced relation as shown. The grain drill 10 is thus supported by the forwardly disposed caster wheel 18 and the rearwardly disposed non-caster press wheels 32 for normal drilling operation. A hitch assembly 34 is pivotally coupled to the forward portion of the drill framework 12 and is adapted for coupling to a tractor for towing in the direction of arrow A.

In accordance with the invention, means are provided for adapting the grain drill for transport in either the direction of normal operation or transversely to that direction. A pair of transport units 36 and 38 is connected to the drill rearwardly of the press wheels 32 as shown generally in FIG. 1. Each transport unit is identical to the other so that a description of one will suffice for both.

Each transport unit includes an elongated frame member 40 of square tubing as shown in the end elevation of FIG. 3. A pair of plates 42 and 44 is welded to the frame member 40 and extend forwardly therefrom for connection to the rearward ends of the drawbars 24 and 26, respectively, by means of bolts 46. A pair of identical transport wheel assemblies is supported on the frame member 40 proximate to the opposite ends thereof. Since the transport wheel assemblies are mirror images of each other, a description of one will suffice for both.

A stub shaft 48 is welded to the frame member 40 and extends rearwardly therefrom to define a substantially horizontal axis. An arm member 50 of channel shape in cross section is pivotally mounted at its lower end on the stub shaft 48. The arm member 50 is pivotable about the axis of the stub shaft 48 in a substantially vertical plane disposed at right angles to the pivot axis. A tubular sleeve 52 is welded to the rear side of the arm member 50 so as to be disposed in parallel relation to the vertical pivot plane of the arm member 50. A small plate 54 is welded to the opposite side of the sleeve 52 and is pivotally mounted on the stub shaft 48 as shown. It will thus be seen that the arm member 50, sleeve 52, and plate 54 provide an integral structure mounted for pivotable movement on the stub shaft 48.

Each transport wheel assembly includes a rubber-tired transport wheel 56 journaled on a yoke 58. The yoke 58 includes a pair of spaced downwardly depending legs 60 and 62 receiving the wheel 56 therebetween. The wheel 56 is journaled on a suitable axle 64 disposed between the legs 60 and 62. The yoke 58 further includes a spindle 66 extending upwardly from the legs 60 and 62 for rotatable mounting in the sleeve 52.

In accordance with the invention, the two transport wheel assemblies of each transport unit 36 and 38 are adapted for movement between ground-engaging and raised positions. Each transport unit includes a hydraulic piston-cylinder unit 68 of the double acting type disposed above and generally parallel to the frame member 40. The cylinder portion of the hydraulic unit 68 is connected to the upper end of one of the arm members 50 by a pin 70. A best shown in FIG. 4, the pin 70 extends transversely from an end of the hydraulic unit 68 through an opening in the arm 50 to thus provide a pivot connection therebetween. Similarly, the piston portion of the hydraulic unit 68 is pivotally connected to the other arm member 50 by means of a pin 72 (FIG. 1). The hydraulic unit 68 is thus supported solely by the pivot connections to the pair of arm members 50. It will of course be understood that the hydraulic units 68 are supplied with pressure fluid through suitable hoses (not shown) coupled into the hydraulic system of the towing tractor.

It will be apparent with reference to FIG. 2 that the transport wheels 56 are pivoted between ground-engaging and raised positions in response to extension and retraction of the hydraulic unit 68. A pair of stops 74 and 76 is welded to the frame member 40 in position to be engaged by the pins 70 and 72 respectively when the hydraulic unit is retracted. The stops 74 and 76 thus serve to establish the position of the transport wheel assemblies in the ground-engaging position shown with reference to the transport unit 36. A similar pair of stops 78 and 80 is welded on the frame member 40 on the opposite side of the respective pivot shafts 48 from the stops 74 and 76 so as to be engaged by the respective arm members 50 when the hydraulic unit 68 is extended. The stops 78 and 80 thus serve to establish the position of the transport wheel assemblies in the raised position shown with reference to the other transport unit 38.

Figure 4:
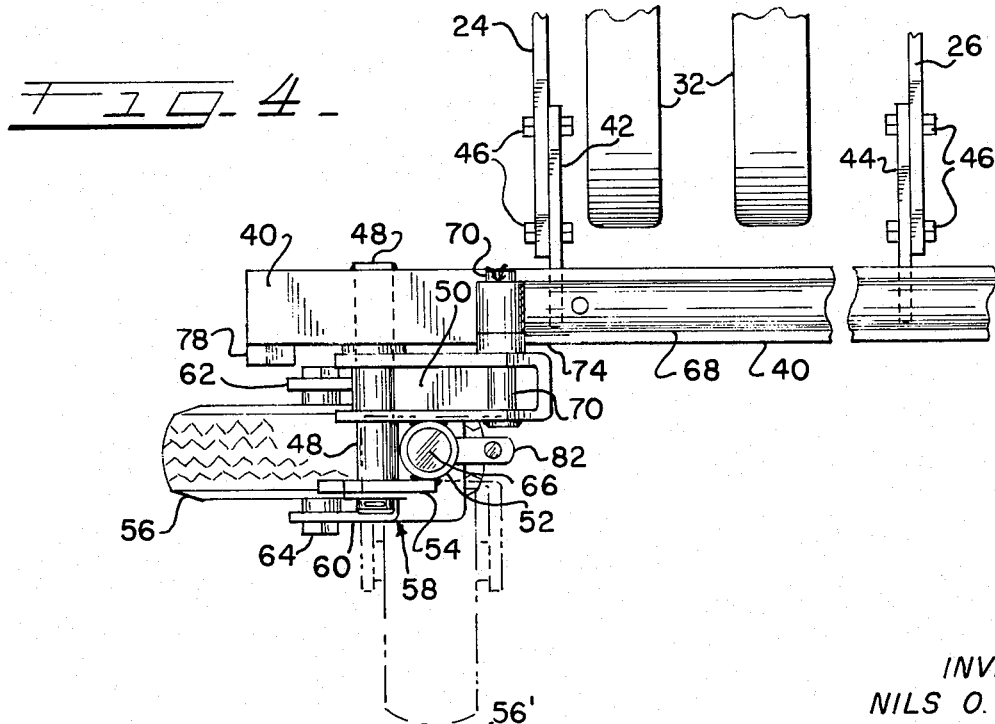
FIG. 4 is a fragmentary plan view of a portion of the transport unit of the invention.

When in the ground-engaging position, each of the transport wheels 56 is shiftable about the axis of the sleeve 52 between the solid line and dotted line positions shown in FIG. 4. Each transport wheel assembly may include means for locking each wheel 56 in the solid line position. A flange 82 projects from the lower portion of the sleeve 52 in a direction parallel to the longitudinal extent of the frame member 40. A similar flange 84 projects from the yoke 58 at a level just beneath that of the flange 82. Both flanges include an opening through which a suitable pin 86 may be inserted to lock the transport wheel in the solid line position. As shown in FIGS. 1 and 2, the grain drill 10 may include an auxiliary hitch 88 pivotally mounted on an end thereof for coupling to a tractor for towing the drill in an endwise direction.

The normal planting or seeding operation is conducted by towing the drill by means of the hitch 34 in the direction of arrow A. The transport units 36 and 38 are both disposed in the raised position shown with reference to the unit 38 in FIG. 2. The drill is thus supported by the caster wheel 18 and the press wheels 32.

When only a single drill 10 is being used and the gates, roadways, etc. are of sufficient width, the operator may desire to transport the drill 10 in the directions of arrow A. The hydraulic units 68 of the transport units 36 and 38 are retracted to thus pivot the transport wheel assemblies about the respective stub shafts 48. As the wheels 56 are moved into the ground-engaging position, the drill is lifted to raise the press wheels 32 from the ground. The weight of the drill is thus supported on the caster wheel 18 and the transport wheels 56.

The various pins 86 would then be removed to free the wheels 56 for shifting movement to the forwardly disposed positions shown in FIG. 1 upon forward movement of the drill. The auxiliary hitch 88 would of course be pivoted upwardly to minimize the overall length of the drill for forward transport. As a practical matter, proper tracking of the drill behind the tractor might require that the front caster wheel 18 be lockable in the forward direction, leaving the transport wheels 56 free to shift about the axes of the respective sleeves 52 to permit the drill to accommodate turns.

The means by which the caster wheel 18 may be selectively locked in either the forward or endwise direction will be seen with reference to FIGS. 1 and 5. The caster wheel 18 is rotatably mounted on a yoke structure 90, similar to the yoke 58, journaled in a vertically disposed sleeve 92. The seeve 92 is secured to a plate 94 projecting forwardly from the center of the framework 12 as shown. A flange 96 extends forwardly from the plate 94 in the direction of forward movement of the drill. A similar flange 98 extends outwardly from the yoke structure 90 at an elevation above the flange 96. Both flanges include a vertical opening through which a suitable pin 100 may be inserted when the openings are vertically aligned to lock the caster wheel in the forward direction. As shown in FIG. 1, a flange 102 projects from the plate 94 at a right angle relative to the forward extent of the flange 96 and includes a vertical opening defined therethrough. Accordingly, the caster wheel 18 is lockable for endwise transport of the drill when the yoke structure 90 is pivoted to dispose the flange 98 above the flange 102 so that the pin 100 may be inserted through the aligned openings.

In a case where a plurality of drills 10 are connected in end-to-end relation, or where the gates, roadways, and the like, will not accommodate the length of a single drill moved forwardly in the direction of arrow A, the tractor is uncoupled from the hitch 34 and recoupled to the auxiliary hitch 88. The caster wheel 18 and the transport wheels 56 are shifted into an endwise direction to accommodate endwise transport. To insure proper tracking, the caster wheel 18 may be locked in the endwise direction as above described, or anyone of the transport wheels 56 may be locked in such direction by insertion of the pin 86 through the flanges 82 and 84.

To reconvert the drill from a transport condition to an operational condition simply involves extending the hydraulic units 68 to pivot the transport wheel assemblies upwardly to the raised position shown in FIG. 2. The drill is thus lowered so that the press wheels 32 engage the ground.

From the foregoing, it will be seen that the transport units of the invention provide a simple and effective means for enabling an implement to be transported either forwardly or in an endwise direction.

What is claimed is:

1. A transport wheel assembly for an agricultural implement having a frame section extending transversely to the forward direction of travel on the implement, the wheel assembly comprising:
    a pair of arm members pivotally mounted in spaced apart relation on said frame section for pivotable movement in a common vertical plane disposed in parallel relation to said frame section;
    a pair of transport wheels mounted on said pair of arm members respectively for pivoting movement with said arm members between a raised position and a ground-engaging position;
    a double acting hydraulic piston-cylinder unit having a cylinder portion pivotally coupled to one of said arm members and a piston portion pivotally coupled to the other of said arm members, whereby said arm members are pivoted in unison in response to extension and retraction of said piston-cylinder unit.

2. The subject matter of claim 1, including means journaling said transport wheels on said arm members for swinging movement about respective axes disposed parallel to said vertical plane.

* * * * *